Aug. 9, 1966  S. ACKERMAN ETAL  3,264,931
AUTOMATIC BRIGHTNESS PYROMETERS
Filed July 10, 1961  2 Sheets-Sheet 1

INVENTOR
SUMNER ACKERMAN
JOSEPH S. LORD
BY Thomas S. Ross
Joseph R. Spalla
ATTORNEYS Aug. 9, 1966  S. ACKERMAN ETAL  3,264,931
AUTOMATIC BRIGHTNESS PYROMETERS
Filed July 10, 1961  2 Sheets-Sheet 2
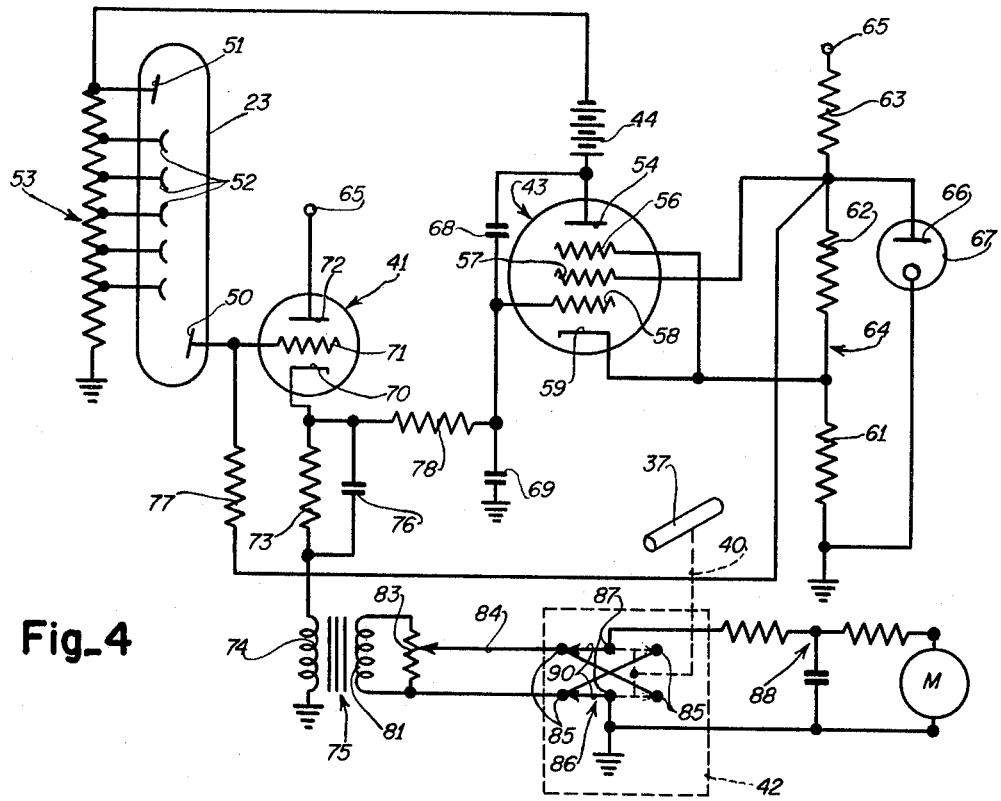
Fig._4
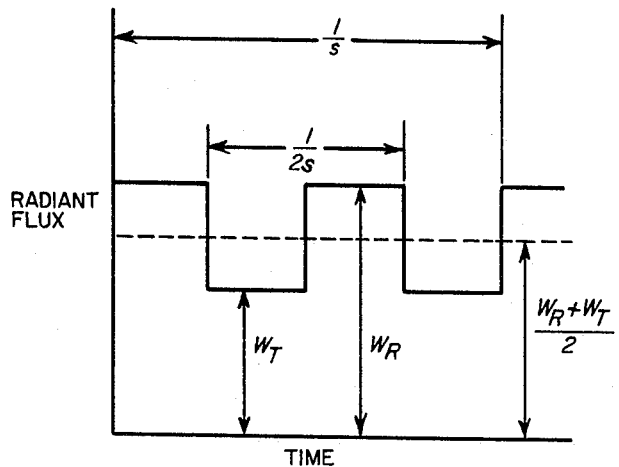
Fig._5
INVENTOR
SUMNER ACKERMAN
JOSEPH S. LORD
BY Thomas S. Ross
Joseph R. Spalla
ATTORNEYS

United States Patent Office 3,264,931
Patented August 9, 1966

---

3,264,931
AUTOMATIC BRIGHTNESS PYROMETERS
Sumner Ackerman, East Walpole, and Joseph S. Lord, Walpole, Mass., assignors, by mesne assignments, to Kollmorgen Corporation, Long Island, N.Y., a corporation of New York
Filed July 10, 1961, Ser. No. 123,032
2 Claims. (Cl. 88—22.5)

This invention relates to automatic brightness pyrometers; more particularly it relates to an automatic brightness pyrometer which provides measurements of temperature in terms of the difference between the radiation from an incandescent body whose temperature is to be determined and that radiated from a stable reference body in a preselected narrow band of wavelengths.

Pyrometers have been in widespread use for many years and are generally referred to as "brightness" or "optical" pyrometers. These prior art pyrometers are manually operated devices requiring the exercise of visual judgment, the human eye being the detector, and consequently have several shortcomings. For example, the requirement of a human observer makes them unsuitable for continuous measurement, analysis, or control. Also, due to the limits of visual acuity, errors of from 1° to 5° C. are not uncommon. Further the low temperature limit of manually operated brightness pyrometers is restricted due to the fact that temperatures below about 750° C. do not radiate sufficient energy in a narrow band of the visible spectrum for visual brightness matching.

In accordance with the present invention an automatic pyrometer suitable for continuous measurement is provided which has practically no error corresponding to the visual acuity error of the prior art pyrometers and which has the capability of measuring temperatures as low as 200° C. and as high as or higher than 4000° C. Briefly temperature is measured by directing radiation from a body whose temperature is to be measured and that radiating from a body operated at a known temperature alternately through a filter to a photosensitive device associated with circuitry designed to derive an output voltage which is independent of the sensitivity of the photosensitive device, and which is a direct quantitative expression of temperature. This output voltage is employed to actuate a recording instrument calibrated in temperature units.

It should be understood that the terms "brightness" pyrometer and "optical" pyrometer when used herein are used in deference to custom and that these terms are not necessarily correct when applied to an instrument which employs a photosensitive detector, nor to an instrument which is not necessarily limited to use in the visible range.

A feature of the invention resides in the employment of a source of reference radiation comprising an incandescent lamp within an integrating sphere whereby the reference radiation is virtually completely independent of lamp filament geometry and position.

A further feature of the invention resides in the employment of an optical system which renders the total energy collected independent of the distance between target area and instrument provided only that the field area is uniform in temperature.

An object of the invention therefore is in the provision of an automatic pyrometer suitable for continuous process work.

A further object of the invention is to provide a brightness pyrometer whose low temperature limit is lower by hundreds of degrees centigrade than that of prior art brightness pyrometers.

Another object of the invention is in the provision of a brightness pyrometer having a long-lived stable source of reference radiation.

Another object of the invention is in the provision of a photoelectric sensor in combination with electronic circuitry for rendering the output of the instrument independent of the sensitivity of the photoelectric sensor.

A further object of the invention is to provide circuitry for the direct, quantitative measurement of temperature by evaluation of radiant flux over a narrow band of wavelengths.

A still further object of the invention is in the provision of a pyrometer apparatus having an optical system which makes the instruments calibration independent of distance between target and optical system and independent of the accuracy of focus on the target without the use of complex and relatively slow-acting mechanical servomechanisms.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 4 is a schematic diagram of the electronic circuitry; and

FIGURE 5 is a diagram showing the radiant flux waveforms incident on the photoelectric sensor.

Figure 1:
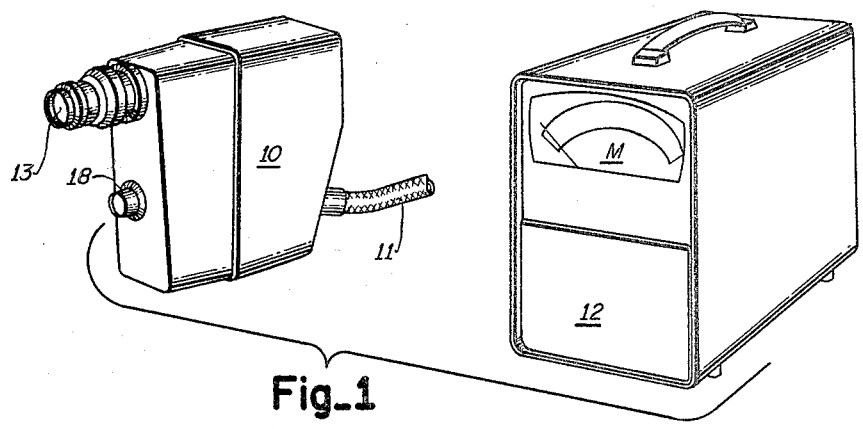
FIGURE 1 is a perspective view showing units of a portable pyrometer apparatus in accordance with the invention.

Referring now to the drawings wherein a preferred embodiment is illustrated there is shown in FIGURE 1 a unit 10, adapted to be aimed at an incandescent body or target whose temperature is to be measured, electrically connected by cable 11 to a unit 12 containing a high voltable power supply and a suitably calibrated recording instrument illustratively shown as a meter M.

Figure 2:
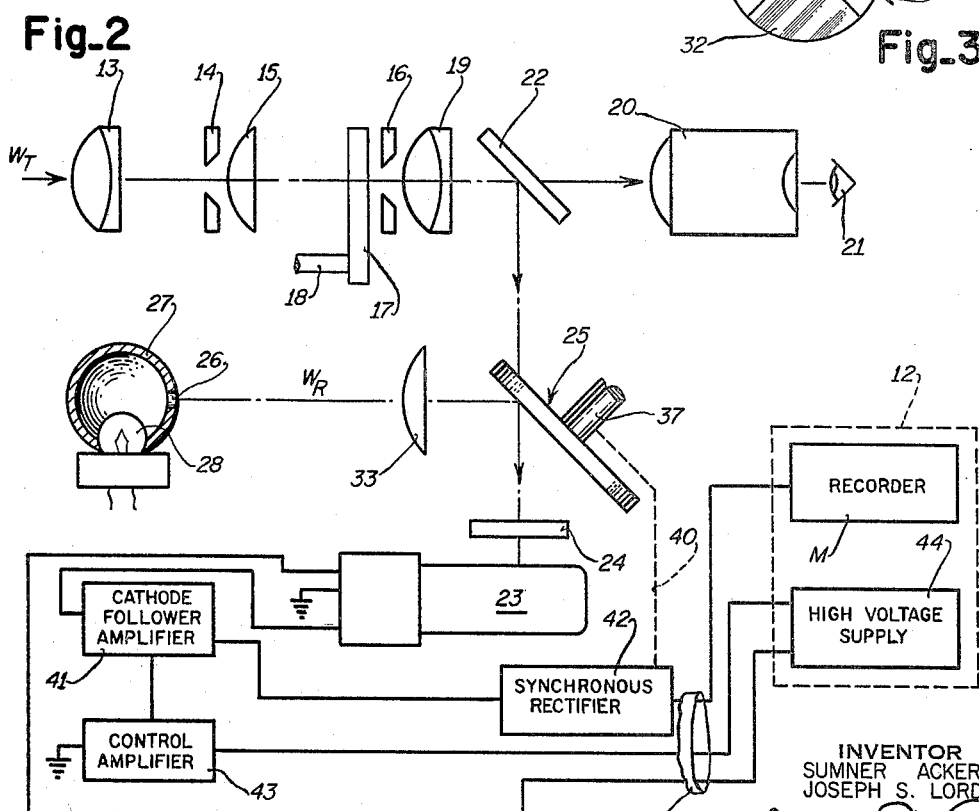
FIGURE 2 is a diagrammatic view of a pyrometer in accordance with the invention showing the optical apparatus together with a block diagram of the electronic circuitry associated therewith.

As shown in FIGURE 2 unit 10 includes an optical system comprising an objective lens 13 whose focus is variable whereby radiation $W_T$ from a target body at varying distances from the objective lens may be imaged on a field stop 14. As is understood in the art the field stop is employed to limit the field of view to a predetermined target body area. Adjacent the field stop 14 is a condensing lens 15 which is provided to image the objective lens on an aperture stop 16 through a range change sector wheel 17 which may be rotated as by an adjusting knob 18 (FIGURE 1) to present selected absorbing filters in the optical path. A field lens 19 is provided to image the field stop 14 on an occular piece 20 through which a viewer may sight on the target body. By means of a beam splitter mirror 22 disposed between the field lens and the occular piece at a 45° angle to the radiation passing through the field lens, the field stop is also imaged on the photosensitive element of a photosensitive device.

In accordance with the invention the aperture stop opening or field lens aperture is the limiting aperture of the optical system. As long as its diameter is less than or equal to the diameter of the objective lens aperture times the magnification of the objective lens aperture by the condensing lens 15, the field lens aperture will be filled and the total energy collected will be independent of the focus of objective lens 13 and the flux imaged on the photosensitive device will be maintained constant. Otherwise stated the calibration of the instrument is not affected by the distance between target body and objective lens provided only that the field being viewed is of uniform temperature and luminous intensity.

As shown in FIGURE 2 the target radiation reflected from the beam splitter mirror 22 is directed toward a photosensitive device 23 alternately with reference radiation $W_R$ through a narrow waveband filter 24 or a filter of the interference type by means of a rotating shutter disc 25. The pass band of the filter 24 is preferably in the short wavelength region, e.g. 650 millimicrons, thereby to minimize errors caused by the emissivity of the target body.

The reference radiation $W_R$ emanates from a port 26 in an integrating sphere 27 wherein is mounted at least one incandescent lamp 28 operating at a predetermined controlled temperature from a constant voltage power supply. Where two lamps are provided in the sphere the second is employed as a standard with which the reference lamp may be periodically checked.

As is understood by persons conversant in the art the diffuse reflection of the energy radiated from the lamp 28 by the interior walls of the integrating sphere 27 renders the radiation emanating from port 26 virtually independent of the lamp filament position and geometry. This permits the use of a reference lamp 28 with a heavy filament or a filament geometry which otherwise contributes to its efficiency and permits the operation of the lamp at a power appreciably lower than its nominal rating whereby its life is appreciably prolonged and whereby its temperature can be maintained to within a few degrees over long periods of time.

Figure 3:
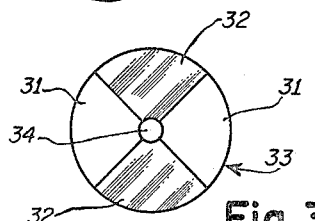
FIGURE 3 is a plan view of a shutter disc.

As shown in FIGURE 3 the shutter disc 25 for alternately directing radiation $W_R$ and $W_T$ to the photosensitive device 23 comprises a predetermined number of alternate clear and silvered areas or segments 31 and 32 and disposed at an angle of 45° to the direction of target and reference radiation, the reference radiation being first directed through a condensing lens 33 whereby it is imaged on the photosensitive device. The disc 25 is driven by the shaft 34 of a synchronous motor (not shown) at a predetermined speed $s$ whereby, when the silvered segments 31 are in the path of the target and reference radiation, the target radiation $W_T$ is reflected away from and the reference radiation $W_R$ is reflected toward the photosensor 23, and when a clear area 32 is in the path of the target and reference radiation, the target radiation $W_T$ passes to the photosensor 23 and the reference radiation $W_R$ does not.

In the embodiment illustrated herein the photosensitive device comprises a photomultiplier although it is to be understood that other types of photosensors are within the scope of the invention. As shown in FIGURE 2 the output of the photomultiplier is connected to a cathode follower amplifier 41 whose output is connected through a rectifier operated synchronously with the shutter disc 25 as indicated by dotted line connection 40 with shaft 34. The signal developed at the cathode of amplifier 41 is also connected to a control tube 43 connected in series with a high voltage supply source 44 and the voltage divided supplying the photocathode and dynodes of the photomultiplier. The above constituted circuit comprises a negative feedback loop between the output of the photomultiplier and its dynode supply and is operative to render the direct current component of the photomultiplier output constant, independent of the magnitudes of $W_R$ and $W_T$, whereby the alternating current output delivered to rectifier 42 will be a direct quantitative expression of the temperature of the target body. That the output will be independent of the magnitudes of $W_R$ and $W_T$ may be understood with reference to FIGURE 5 which shows the radiant flux incident on the photocathode. As is apparent the current developed by the photomultiplier in response thereto comprises an alternating current component, $I_{ac}=G(W_R-W_T)$, superimposed on a direct current component.

$$I_{dc}=G\left(\frac{W_R+W_T}{2}\right)$$

where G is the sensitive (gain) of the photomultiplier. With $I_{dc}$ maintained constant, i.e.

$$G\left(\frac{W_R+W_T}{2}\right)=\frac{K}{2}, \ G=\frac{K}{W_R+W_T}$$

Substituting this expression for G in the $I_{ac}$ equation, the photomultiplier output current, and of course its output voltage is rendered equal to $$E_0=K\left(\frac{W_R-W_T}{W_R+W_T}\right)$$

As is evident the output is independent of the gain of the photomultiplier with the result that the instrument is inherently stable.

Thus, the photomultiplier 23 is electronically stabilized and, as heretofore stated, since the reference lamp temperature, $W_R$, can be held very stable, the output signal derived from amplifier 41 i.e.

$$E_0=K\left(\frac{W_R-W_T}{W_R+W_T}\right)$$

is a function of the target radiation $W_T$. As shown in FIGURE 2 the output of the synchronous demodulator is fed to a recording instrument M calibrated in temperature units. By substituting the expression $$W=\frac{C_1}{\lambda^5}e^{\frac{-C_2}{\lambda T}}$$

(Wien's law for spectral radiation) for $W_T$, the output $E_0$ of amplifier 41 becomes $$K\left[\frac{W_R-\epsilon_\lambda C_1\lambda^{-5}e^{\frac{-C_2}{\lambda T}}}{W_R+\epsilon_\lambda C_1\lambda^{-5}e^{\frac{-C_2}{\lambda T}}}\right]$$

where W is in watts radiated/cm.$^2$/$\mu$ wavelength band, $\lambda$ is the effective wavelength of the filter and photomultiplier in millimicrons, $C_1$ and $C_2$ are constants, T is in °K and $\epsilon_\lambda$ is the spectral emissivity of the target at wavelength $\lambda$, which can be determined to permit the measurement of true temperature within industrial tolerances on the calibrated meter M. This output then is a direct quantitative expression of temperature.

Referring now to FIGURE 4 for a more detailed description of the circuitry shown heretofore in block form in FIGURE 2 there is shown the photomultiplier tube 23 comprising an anode 50, a photocathode 51 upon which the radiant flux passed by filter 24 is directed and a plurality of dynodes 52 positioned between the photocathode and anode. A voltage divider 53 is provided, one end of which is grounded and the other end of which is connected to the negative terminal of a high voltage source, illustratively shown as a battery 44, which provides voltage for the photocathode and dynodes connected to the divider at increasingly more positive taps toward the anode end of the tube whereby electron multiplication is accomplished as is understood in the art.

The positive terminal of the high voltage source is connected to the anode 54 of the control amplifier 43 which comprises a suppressor grid 56, screen grid 57, control grid 58, and cathode 59. The cathode of amplifier 43 is returned to ground through a resistor 61 comprising together with resistors 62 and 63 a voltage divider network 64 connected across the positive terminal 65 of a B power supply and ground. The screen grid 57 is connected to the voltage divider network between resistors 62 and 63 as is the anode 66 of a voltage regulator tube 67 whose cathode is connected to ground whereby the screen grid potential is maintained constant.

The control grid 58 is coupled by a feedback capacitor 68 to the anode 54 thereof to reduce the A.C. gain and thereby improve the stability of the feedback circuit. The control grid 58 is also coupled to ground through a filter capacitor 69.

The cathode follower amplifier 41 comprises a cathode 70, control grid 71 and anode 72. The anode is connected to the positive terminal 65 of the B power supply and the cathode 71 is connected to ground through a resistor 73 in series with the primary winding 74 of a transformer 75. A by-pass capacitor 76 is connected in parallel with the cathode resistor 73.

As shown in FIGURE 4 the anode 50 of the photomultiplier is connected directly to the control grid 71 of the cathode follower 41 and to the junction of resistors 62 and 63 of the voltage divider 64 through a resistor 77. Signals at the cathode 70 resulting from the signals on the grid 71 thereof are connected through a resistor 78 to the grid 58 of control amplifier 43.

When the average flux impinging on the photocathode 51 increases in magnitude, the average voltage at the grid 71 and the cathode 70 of the cathode follower stage tends to decrease, i.e., becomes less positive with respect to ground potential. Therefore, the voltage between grid 58 and cathode 59 of the control amplifier tube 43 also decreases, causing an increase in the plate-to-cathode resistance of this tube. Hence, the dynode voltage to the photosensor decreases; this in turn reduces the tendency for its photocurrent to increase. In a similar manner the dynode voltage is caused to increase if the average flux decreases. By this feedback mechanism the current from the photosensor is caused to remain virtually constant regardless of the average level of the flux. The resistor 78 and the capacitor 69 act as a low-pass filter to prevent alternating components of flux from operating the constant current feedback circuit just described. The resistors 61, 62, and 63 are chosen to produce a desired level of constant average current from the photosensor. The voltage reference tube 67 stabilizes the cathode voltage of the control amplifier tube 43 so that the value of average current will also remain stable.

The alternating output $$E_0 = K\left(\frac{W_R - W_T}{W_R + W_T}\right)$$

across the cathode follower load circuit i.e., primary winding 74 induces an A.C. current in the secondary winding 81 thereof. As shown in FIGURE 4 a resistor 83 is connected across the secondary winding. An adjustable arm 84 connects the voltage developed across the resistor 83 to the cross connected stationary contacts 85 of a double pole double throw switch 86 comprising the synchronous rectifier 42. The movable contact terminals 87 are connected through a filter network 88 to the recording meter M or other suitable recording instrument calibrated in terms of temperature. As shown in the figure the movable contacts 90 of switch 86 are driven from the shaft 34 of the synchronous motor at a frequency 2s in accordance with the four segment shutter disc, whereby the A.C. output is synchronously rectified, as is understood in the art, resulting in an output which is a direct quantitative measurement of target temperature. Changes in temperature range can be accomplished through range change knob 18 which changes the absorbing filter in the optical path and/or aperture changes keeping the reference lamp temperature constant, or alternately, by varying the reference lamp temperature, or by a combination of both measures.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. Pyrometer apparatus comprising an integrating sphere, a source of reference radiation within said sphere, a radiation sensitive device, a narrow band filter, optical means for directing radiation emanating from a target body whose temperature is to be measured and that emanating from said integrating sphere alternately through said filter on said radiation sensitive device, said optical means including means for focusing the target on the radiation sensitive device, and detector means connected to said radiation sensitive device for producing a voltage corresponding in amplitude to said target temperature and indicating means responsive to said voltage for measuring the temperature of said target.

2. Pyrometer apparatus comprising a source of reference radiation disposed within an integrating sphere, a narrow band filter, a photomultiplier, optical means for directing radiation emanating from a target body whose temperature is to be measured and that emanating from said integrating sphere alternately through said filter on the photocathode of said photomultiplier, said optical means including means for focusing the target on the radiation sensitive device, and means responsive to the output of said photomultiplier for maintaining the direct current component of the output constant whereby the alternating current component of the photomultiplier output is a function of said target body temperature.

References Cited by the Examiner

UNITED STATES PATENTS

| 1,960,169 | 5/1934 | Schoenberg | 88—14 |
|---|---|---|---|
| 2,074,641 | 3/1937 | Clark | 88—22.5 |
| 2,678,581 | 5/1954 | Reisner. | |
| 2,710,559 | 6/1955 | Heitmuller et al. | 88—22.5 |
| 2,813,203 | 11/1957 | Machler | 250—220 |
| 3,044,349 | 7/1962 | Watrous | 88—14 X |
| 3,057,253 | 10/1962 | Johnson | 88—22.5 |

FOREIGN PATENTS

| 739,540 | 9/1943 | Germany. |
|---|---|---|
| 636,544 | 5/1950 | Great Britain. |

JEWELL H. PEDERSEN, *Primary Examiner.*

E. G. ANDERSON, *Examiner.*

T. L. HUDSON, *Assistant Examiner.*